United States Patent
Jiang

(10) Patent No.: US 8,514,897 B2
(45) Date of Patent: Aug. 20, 2013

(54) METHOD AND DEVICE FOR MAPPING ETHERNET CODE BLOCKS TO OTN FOR TRANSMISSION

(75) Inventor: Zhangzhen Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 739 days.

(21) Appl. No.: 12/643,480

(22) Filed: Dec. 21, 2009

(65) Prior Publication Data

US 2010/0098415 A1    Apr. 22, 2010

Related U.S. Application Data

(63) Continuation of application No. PCT/CN2008/071474, filed on Jun. 27, 2008.

(30) Foreign Application Priority Data

Jun. 29, 2007  (CN) .......................... 2007 1 0129550

(51) Int. Cl.
*H04J 3/02*    (2006.01)
(52) U.S. Cl.
USPC ............. 370/537; 370/395.51; 370/395.6; 370/466; 370/536; 370/542
(58) Field of Classification Search
USPC ............. 370/395.51, 395.6, 466, 534–537, 370/540–542, 544
See application file for complete search history.

(56) References Cited

U.S. PATENT DOCUMENTS

| | | | |
|---|---|---|---|
| 2003/0048813 A1* | 3/2003 | Lahav et al. | 370/537 |
| 2006/0126662 A1 | 6/2006 | Huang | |
| 2007/0248121 A1* | 10/2007 | Zou | 370/498 |

FOREIGN PATENT DOCUMENTS

| | | |
|---|---|---|
| CN | 1747606 A | 3/2006 |
| CN | 1770673 A | 5/2006 |
| CN | 1787514 A | 6/2006 |
| CN | 1790993 A | 6/2006 |
| CN | 1881845 A | 12/2006 |
| EP | 1670175 A1 | 6/2006 |
| EP | 1 826 926 A1 | 8/2007 |

OTHER PUBLICATIONS

Trowbridge et al., 40GbE MTTFPA When Using Transcoding, Mar. 2008, IEEE P802.3ba Task Force, Orlandl, FL, p. 1-24.*
Qiwen, 40GE Interface, Sep. 10, 2007-Sep. 13, 2007, IEEE 802.3 Higher Speed Study Group, Seoul, South Korea, p. 1-16.*
Duelk, 40 GbE Transport, Jul. 16, 2007-Jul. 19, 2007, IEEE HSSG Meeting, San Francisco, p. 1-23.*

(Continued)

*Primary Examiner* — Hoon J Chung
(74) *Attorney, Agent, or Firm* — Leydig, Voit & Mayer, Ltd.

(57) ABSTRACT

A method and a device for mapping Ethernet code blocks to an optical transport network (OTN) for transmission is provided. According to a preset mapping manner, four groups of 10 Gigabit (10G) Ethernet code blocks are uniformly mapped to a payload area of a general frame provision (GFP) frame, or each group of 10G Ethernet code blocks is interleaved into the payload area of each row of the OTN frame. Thus, specific solutions for mapping four groups of 10G Ethernet code blocks having an encoding rate smaller than the minimum payload bandwidth of the OPU3 to the OTN for transmission are provided, thereby achieving transparent transmission without changing the mature OTN architecture.

8 Claims, 10 Drawing Sheets

Four groups of 10G Ethernet code blocks are uniformly mapped to a payload area of a GFP frame according to a preset mapping manner, and a header UPI of the GFP frame is set to identify the mapping manner — S101

The obtained GFP frame is mapped to an OPU3 of an OTN, and is sent out. When the GFP frame is sent, if it is found that payload data in the GFP frame is not enough to maintain continuous data transmission, justification control is performed on the GFP frame — S102

(56) References Cited

OTHER PUBLICATIONS

European Patent Office, Examination Report in European Patent Application No. 10190789.7 dated Jan. 23, 2012.

Extended European Search Report in corresponding European Application No. 10190789.7 (Feb. 18, 2011).

Kisaka et al., "Fully transparent multiplexing and transport of 10GbE-LANPHY signals in 44.6-Gbit/s-based RZ-DQPSK WDM transmission," 2006, Optical Society of America, Washington, D.C.

"Series G, Supplement 43—Transport of IEEE 10G Base-R in Optical Transport Networks (OTN)," Series G: Transmission Systems and Media, Digital Systems and Networks, Nov. 2006, International Telecommunications Union, Geneva, Switzerland.

"G.709/Y.1331—Interfaces for the Optical Transport Network (OTN)," Series G: Transmission Systems and Media, Digital Systems and Networks, Digital terminal equipments—General, Series Y: Global Information Infrastructure, Internet Protocol Aspects and Next Generation Networks, Internet Protocol Aspects, Transport, Mar. 2003, International Telecommunications Union, Geneva, Switzerland.

Office Action in corresponding European Application No. 08757873.8 (Mar. 22, 2012).

Duelk, Marcus, "Considerations for 40 Gigabit Ethernet," IEEE HSSG Meeting, May 28-31, 2007, IEEE, Piscataway, New Jersey.

Extended European Search Report in counterpart European Application No. 08757873.8-2415, mailed Aug. 5, 2010.

Written Opinion in counterpart PCT Application No. PCT/CN2008/071474, mailed Oct. 23, 2008.

"Series G: Transmission Systems and Media, Digital Systems and Networks—Data over Transport—Generic aspects—General; Series Y: Global Information Infrastructure, Internet Protocol Aspects and Next-Generation Networks—Internet protocol aspects—Transport—General Framing procedure (GFP)," *International Telecommunication Union*, Standard No. G.7041/Y.1303 (Aug. 2005).

"Series G: Transmission Systems and Media, Digital Systems and Networks—Transport of IEEE 10G Base-R in Optical Transport Networks (OTN)," *International Telecommunication Union*, Series G—Supplement 43 (Nov. 2006).

"Introduction of GFP [Generic Framing Procedure]," [date unknown].

"IEEE Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specifications—Amendment 1: Media Access Control (MAC) Parameters, Physical Layers, and Management Parameters for 10 Gb/s Operation," *IEEE*, Standard No. 802.3ae-2002 (Amendment to IEEE Standard 802.3-2002), Aug. 30, 2002.

Duelk, Marcus [of Bell Labs/Alcatel-Lucent], "Considerations for 40 Gigabit Ethernet," IEEE HSSG Meeting, Geneva, Switzerland, May 28-31, 2007.

\* cited by examiner

|   | 1 | 2 | 3 | 4 | 5 | 6 | 7 | 8 | 9 | 10 | 11 | 12 | 13 | 14 | 15 | 16 | | |
|---|---|---|---|---|---|---|---|---|---|---|---|---|---|---|---|---|---|---|
| 1 | FAS | | | | | | MFAS | SM | | | GCC0 | | RES | | | | Client Specific Portion | OPUk Payload | OTUk FEC |
| 2 | RES | | TCM ACT | TCM6 | | | | TCM5 | | | TCM4 | | FTFL | | | |
| 3 | TCM3 | | TCM2 | | | TCM1 | | | PM | | EXP | | | | | |
| 4 | GCC1 | | GCC2 | | APS/PCC | | | | | RES | | | | | PSI | |

FIG. 2

A plurality of 10G Ethernet code blocks is uniformly distributed into four groups according to a mapping manner for arranging a predetermined number of 10G Ethernet code blocks in each row of an OTN frame corresponding to an OPU3, each group of 10G Ethernet code blocks is interleaved into a payload area of each row of the OTN frame, and a PT in a PSI of an OH portion of the OTN frame is used to indicate the mapping manner — S201

The OTN frame is sent. If it is found that data in the payload area of each row of the OTN frame is not enough when the OTN frame is sent, justification control is performed on each row of the OTN frame by using an idle block, and a corresponding justification control identifier is set at the OH portion in each row of the OTN frame to indicate that the idle block in each row is adapted for justification control — S202

FIG. 9

METHOD AND DEVICE FOR MAPPING ETHERNET CODE BLOCKS TO OTN FOR TRANSMISSION

CROSS-REFERENCE TO RELATED APPLICATIONS

This application is a continuation of International Application No. PCT/CN2008/071474, filed on Jun. 27, 2008, which claims priority to Chinese Patent Application No. 200710129550.3, filed on Jun. 29, 2007, both of which are hereby incorporated by reference in their entireties.

FIELD OF THE TECHNOLOGY

The present invention relates to the field of communication, and more particularly to a technology of mapping Ethernet code blocks to an optical transport network (OTN) for transmission.

BACKGROUND OF THE INVENTION

With the increasing bandwidth requirements caused by the increase in people's demand for voice, data, multimedia, and other services, the OTN has gradually become a core platform for bearer services of various operators. Transmission of 10 Gigabit (10G)
Ethernet service data on the OTN is currently considered a hot topic.

FIG. 1 is a schematic structural view of an OTN frame. As shown in FIG. 1, the OTN frame includes an Optical Channel Payload Unit-k (OPUk) Payload, an Optical Channel Transport Unit-k (OTUk) Forward Error Correction (FEC), and the following overhead (OH) portion caused by transmitting the payload:

OPUk OH; Optical Channel Data Unit-k (ODUk) OH; and OTUk OH.

FIG. 2 is a schematic view of an OH structure of the OTN frame shown in FIG. 1. Referring to FIG. 2, a client specific portion is set at positions corresponding to $15^{th}$ and $16^{th}$ bytes. The portion contains a payload structure identifier (PSI) occupying one byte.

OPU types and capacity corresponding to the OPUk are as shown in Table 1.

TABLE 1

| OPU type | OPU Payload nominal bit rate | OPU Payload bit rate tolerance |
|---|---|---|
| OPU1 | 2 488 320 kbit/s | ±20 ppm |
| OPU2 | 238/237 × 9 953 280 kbit/s | |
| OPU3 | 238/236 × 39 813 120 kbit/s | |
| OPU1-Xv | X * 2 488 320 kbit/s | ±20 ppm |
| OPU2-Xv | X * 238/237 * 9 953 280 kbit/s | |
| OPU3-Xv | X * 238/236 * 39 813 120 kbit/s | |

NOTE-
The nominal OPUk Payload rates are approximately: 2 488 320.000 kbit/s (OPU1 Payload), 9 995 276.962 kbit/s (OPU2 Payload) and 40 150 519.322 kbit/s (OPU3 Payload). The nominal OPUk-Xv Payload rates are approximately: X * 2 488 320.000 kbit/s (OPU1-Xv Payload), X * 9 995 276.962 kbit/s (OPU2-Xv Payload) and X * 40 150 519.322 kbit/s (OPU3-Xv Payload).

It can be seen that, the payload bandwidth of the OPU3 is 40.150519322 GBits/s, which is slightly higher than 40 GBits/s. Considering a clock offset of −20 ppm in the OTN, the minimum payload rate of the OPU3 is 40.150519322 GBits/s*0.999980=40.149716311 GBits/s. The payload bandwidth of the OPU2 is 9.995276962 GBits/s, which is slightly smaller than 10 GBits/s.

Currently, it is suggested that 10G Ethernet service data be encoded through a 64/66B encoding scheme, the payload rate of the MAC layer be the standard 10 GBits/s, and the encoding rate required by the physical (PHY) layer for transmitting code blocks be 66/64*10 GBits/s=10.3125 GBits/s.

Since the payload bandwidth of the OPU2 is smaller than the encoding rate required by the 10G Ethernet PHY layer, 10G Ethernet code blocks cannot be directly borne by the OPU2. Considering that the payload bandwidth of the OPU3 is higher than 40 GBits/s, four groups of 10G Ethernet code blocks can be borne by the OPU3. However, since the payload bandwidth of the OPU3 is only 0.375% higher than 40 GBits/s, the encoding rate of the 10G Ethernet code blocks needs to be reduced, for example, by encoding the 10G Ethernet code blocks into 60B or 58B code blocks through a (64*N)B/(64*N+1)B encoding scheme, such that the encoding rate of the four groups of 10G Ethernet code blocks is smaller than the minimum payload bandwidth of the OPU3.

Although the payload bandwidth requirements for transmission of the four groups of 10G Ethernet code blocks in the OTN can be met after the encoding rate of the four groups of 10G Ethernet code blocks is reduced to be smaller than the minimum payload bandwidth of the OPU3, no specific solution for mapping the four groups of 10G Ethernet code blocks to the OTN is provided currently.

SUMMARY OF THE INVENTION

Accordingly, the present invention is directed to a method and a device for mapping Ethernet code blocks to an OTN for transmission, so as to provide specific solutions for mapping four groups of 10G Ethernet code blocks having an encoding rate smaller than a minimum payload bandwidth of OPU3 to the OTN for transmission.

The present invention is realized through the following technical solutions.

In an embodiment, the present invention provides a method for mapping Ethernet code blocks to an OTN for transmission, which includes the following steps.

Four groups of 10G Ethernet code blocks are mapped uniformly to a payload area of a general frame provision (GFP) frame according to a preset mapping manner, and a corresponding identifier is set to identify the mapping manner.

The GFP frame is mapped to an OTN, and sent out.

In an embodiment, the present invention further provides a sending device, which includes a mapping unit and a transmission unit.

The mapping unit is adapted to uniformly map four groups of 10G Ethernet code blocks to a payload area of a GFP frame according to a preset mapping manner, and set a corresponding identifier to identify the mapping manner.

The transmission unit is adapted to map the GFP frame to an OTN, and send the GFP frame.

In an embodiment, the present invention further provides a method for mapping Ethernet code blocks to an OTN for transmission, which includes the following steps.

A received GFP frame is decoded to obtain an identifier for identifying a mapping manner, and a mapping manner for uniformly mapping four groups of 10G Ethernet code blocks to a payload area of the GFP frame is obtained according to a value of the identifier.

The four groups of 10G Ethernet code blocks are decoded in the GFP frame according to the mapping manner.

In an embodiment, the present invention further provides a receiving device, which includes an information acquisition unit and a decoding unit.

The information acquisition unit is adapted to decode a received GFP frame to obtain an identifier for identifying a mapping manner, and obtain a mapping manner for uniformly mapping four groups of 10G Ethernet code blocks to a payload area of the GFP frame according to a value of the identifier.

The decoding unit is adapted to decode the four groups of 10G Ethernet code blocks in the GFP frame according to the mapping manner.

In an embodiment, the present invention further provides a method for mapping Ethernet code blocks to an OTN for transmission, which includes the following steps.

A plurality of 10G Ethernet code blocks is uniformly distributed into four groups according to a mapping manner for arranging a predetermined number of 10G Ethernet code blocks in each row of an OTN frame corresponding to an OPU3, and then each group of 10G Ethernet code blocks is interleaved into a payload area of each row of the OTN frame, and a corresponding mapping manner indication identifier is set at an OH portion of the OTN frame to indicate the mapping manner.

The obtained OTN frame is mapped to an OPU3 of the OTN, and sent out.

In an embodiment, the present invention further provides a sending device, which includes a mapping unit and a transmission unit.

The mapping unit is adapted to uniformly distribute a plurality of 10G Ethernet code blocks into four groups according to a mapping manner for arranging a predetermined number of 10G Ethernet code blocks in each row of an OTN frame corresponding to an OPU3, interleave each group of 10G Ethernet code blocks into a payload area of each row of the OTN frame, and set a corresponding mapping manner indication identifier at an OH portion of the OTN frame to indicate the mapping manner.

The transmission unit is adapted to map the obtained OTN frame to the OPU3 of the OTN, and send the OTN frame.

In an embodiment, the present invention further provides a method for mapping Ethernet code blocks to an OTN for transmission, which includes the following steps.

A received OTN frame is decoded to obtain a mapping manner indication identifier, and a mapping manner for arranging a predetermined number of 10G Ethernet code blocks in each row of the OTN frame corresponding to an OPU3 is obtained according to the mapping manner indication identifier.

The 10G Ethernet code blocks in each row of the OTN frame are decoded according to the mapping manner.

In an embodiment, the present invention further provides a receiving and processing device, which includes an information acquisition unit and a decoding unit.

The information acquisition unit is adapted to decode a received OTN frame to obtain a mapping manner indication identifier, and obtain a mapping manner for arranging a predetermined number of 10G Ethernet code blocks in each row of the OTN frame corresponding to an OPU3 according to the mapping manner indication identifier.

The decoding unit is adapted to decode the 10G Ethernet code blocks in each row of the OTN frame according to the mapping manner.

It can be seen from the technical solutions of the present invention that, according to a preset mapping manner, four groups of 10G Ethernet code blocks are uniformly mapped to a payload area of a GFP frame, or each group of 10G Ethernet code blocks is interleaved into a payload area of each row of an OTN frame. Thus, the present invention provides specific solutions for mapping four groups of 10G Ethernet code blocks having an encoding rate smaller than the minimum payload bandwidth of the OPU3 to the OTN for transmission.

BRIEF DESCRIPTION OF THE DRAWINGS

FIG. 2 is a schematic view of an OH structure of the OTN frame in the prior art;

FIG. 9 is a flow chart according to a second embodiment of the present invention.

DETAILED DESCRIPTION OF THE EMBODIMENTS

Considering that the GFP is a mapping format commonly used in the OTN, and can bear high-layer client signals over a byte-synchronous transport network, it is feasible to map four groups of 10G Ethernet code blocks having an encoding rate smaller than the minimum payload bandwidth of the OPU3 to a GFP frame, and then map the GFP frame to an OPU of an OTN.

Figure 1:
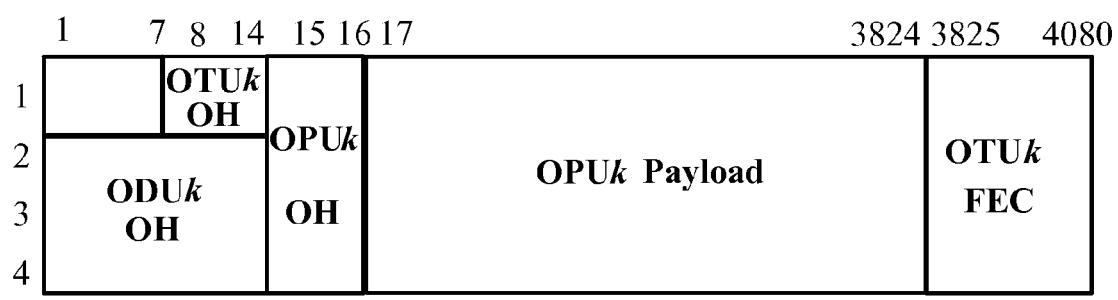
FIG. 1 is a schematic structural view of an OTN frame in the prior art.
Figure 3:
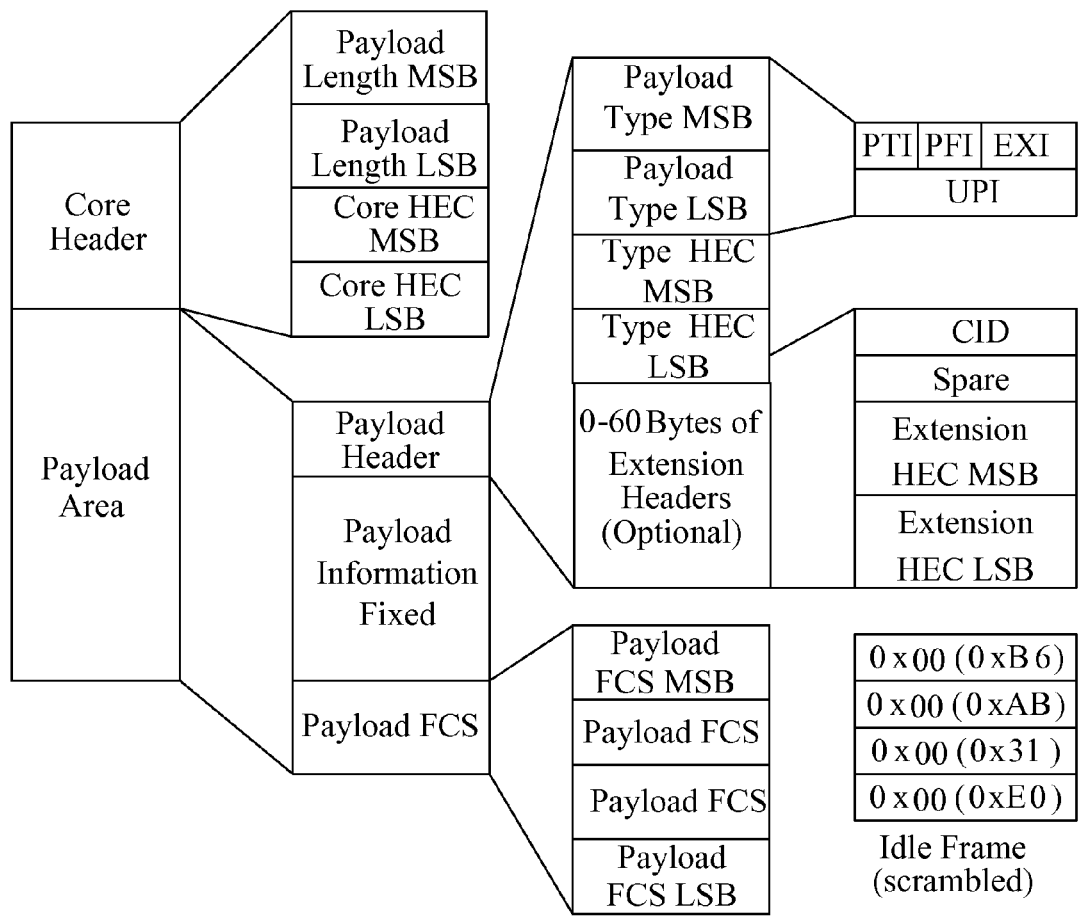
FIG. 3 is a schematic structural view of a GFP frame.

FIG. 3 is a schematic structural view of a GFP frame, which includes a core header and a payload area, and occupies 65535 bytes. The core header occupies 4 bytes, including a payload length most significant bit (MSB), a payload length least significant bit (LSB), a core header error check (HEC) MSB, and a core HEC LSB. The payload area further includes a payload header, a payload information fixed, and a payload frame check sequence (FCS). The payload header includes a payload type MSB, a payload type LSB, a type HEC MSB, a type HEC LSB, and some reserved bytes for extension, and may occupy 60 bytes at most. The payload type MSB and payload type LSB are identified by a payload type identifier (PTI), a payload FCS identifier (PFI), an extension header identifier (EXI), and a user payload identifier (UPI).

Figure 4:
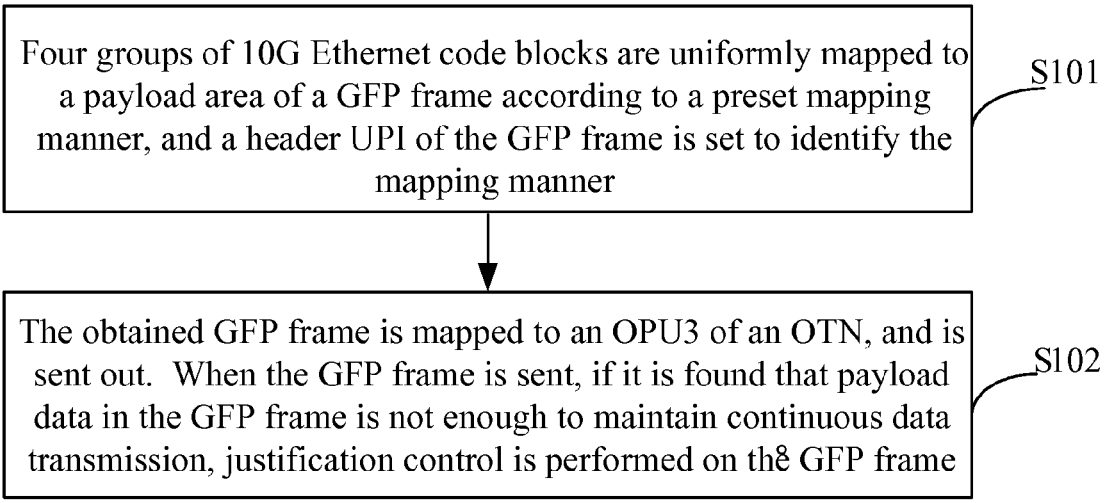
FIG. 4 is a flow chart according to a first embodiment of the present invention.

Based on the above consideration, in a first embodiment, the present invention provides a method for mapping Ethernet code blocks to an OTN for transmission. Referring to FIG. 4, the method includes the following steps.

In Step S101, four groups of 10G Ethernet code blocks are uniformly mapped to a payload area of a GFP frame according to a preset mapping manner, and a header UPI of the GFP frame is set to identify the mapping manner.

In order to ensure that the four groups of 10G Ethernet code blocks are uniformly mapped to the payload area of the GFP frame, the four groups of 10G Ethernet signals are multiplexed and encoded, and then the obtained code blocks are mapped to the payload area of the GFP frame.

Figure 5:
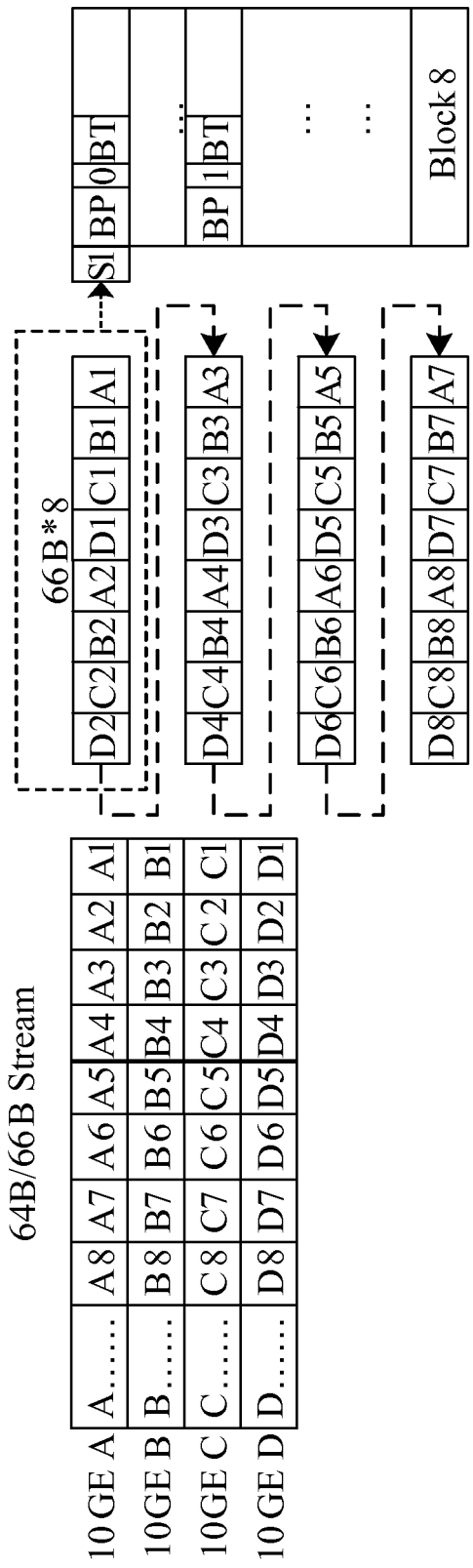
FIG. 5 is a schematic view of a multiplexing process for encoding four groups of 10G Ethernet signals through a (64*N)B/(64*N+1)B (N=8) encoding scheme according to the first embodiment of the present invention.

FIG. 5 is a schematic view of an exemplary multiplexing process for encoding four groups of 10G Ethernet signals through a (64*N)B/(64*N+1)B (N=8) encoding scheme. In FIG. 5, original four groups of 10G Ethernet signals are shown on the left, and four groups of 10G Ethernet code blocks formed after multiplexing are shown in the middle. Here, each group of 10G Ethernet code blocks includes eight code blocks on the right. It can be seen that, each group of 10G Ethernet code blocks formed after multiplexing includes two types of code blocks of each original group of 10G Ethernet signals.

Considering that the GFP frame can bear high-layer client signals over a byte-synchronous transport network, when each group of 10G Ethernet code blocks is mapped to the payload area of the GFP frame, it is feasible to take eight 10G Ethernet code blocks as a code block group, and then map the code block group to the GFP frame. For the convenience of encoding and decoding, Syn fields of all 10G Ethernet code blocks in the group are gathered into the first byte and arranged in an order from Syn1 to Syn8, and then all the 10G Ethernet code blocks in the group are arranged after the first byte sequentially.

Figure 6:
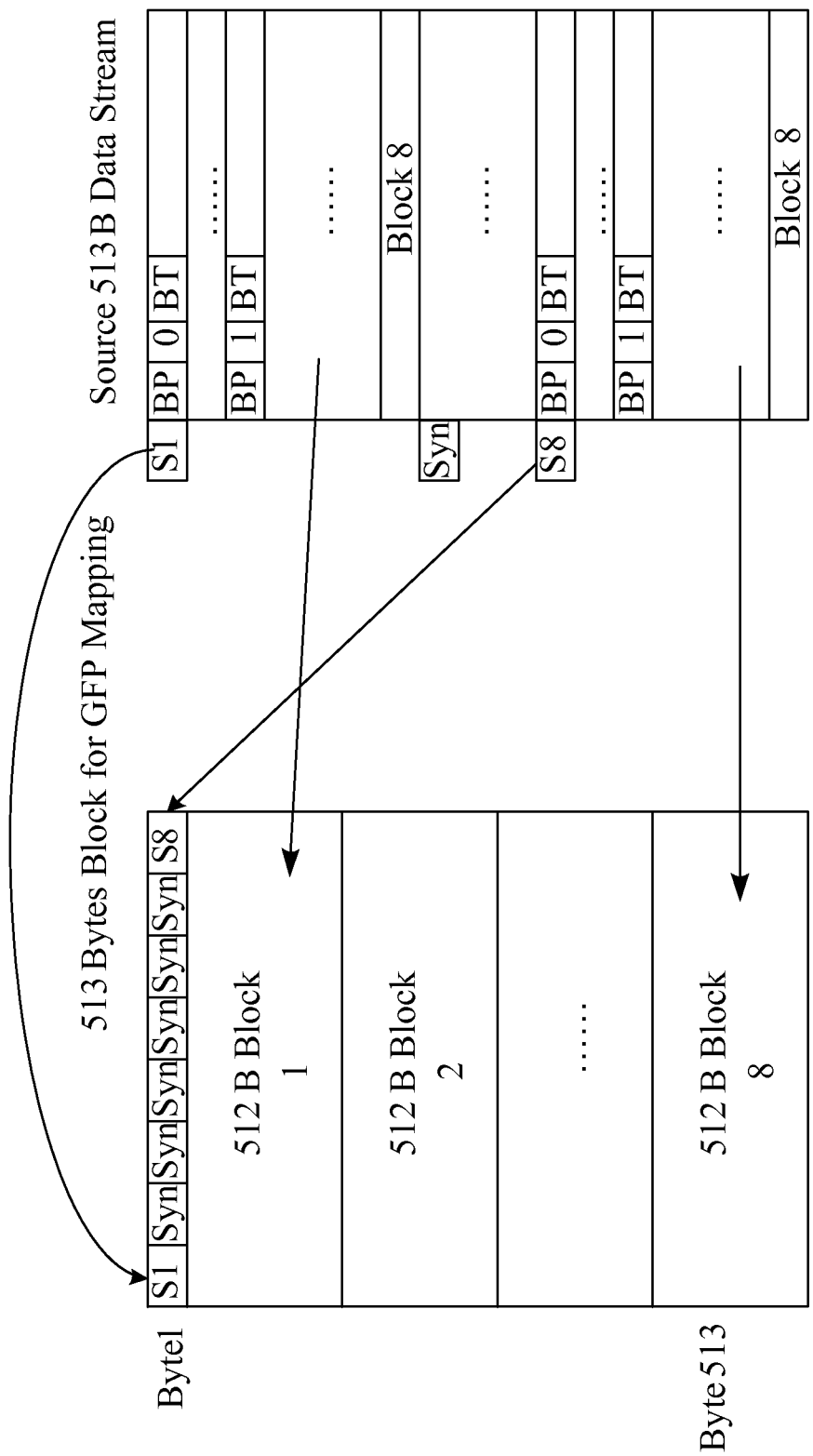
FIG. 6 is a schematic view of a mapping process for mapping eight 512-bit 10G code blocks into a 513B*8 code block according to the first embodiment of the present invention.

FIG. 6 is a schematic view of a mapping process for mapping eight 512-bit 10G code blocks to the payload area of the GFP frame to obtain a 513B*8 code block. In FIG. 6, a structure of the 512-bit 10G Ethernet code blocks is shown on the right, and a structure of the 513B*8 code block obtained through encoding is shown on the left. It can be seen that, in the 10G Ethernet code blocks on the right, every eight 512-bit code blocks are corresponding to a code block occupying one byte in the GFP frame on the left.

Figure 7:
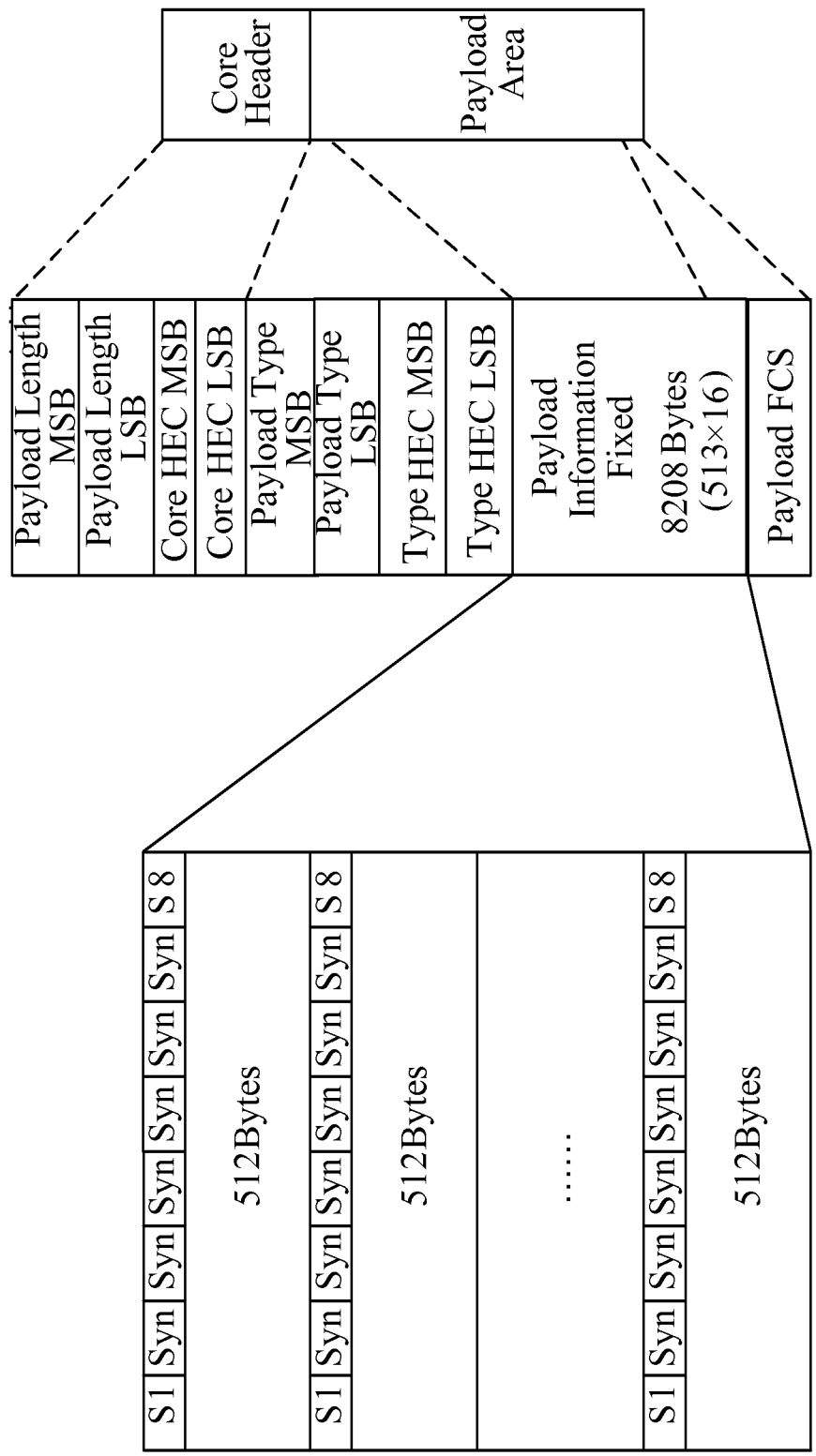
FIG. 7 is a schematic view of a mapping process for mapping four groups of 513B*8 10G Ethernet code blocks to a GFP frame according to the first embodiment of the present invention.

After the four groups of 10G Ethernet signals are multiplexed and encoded, the obtained four groups of 10G Ethernet code blocks are mapped to the payload area of the GFP frame, a core header and a payload header are added, and optionally, a payload FCS is added in order to ensure the transmission reliability. FIG. 7 is a schematic view of an instance of a mapping process for mapping four groups of 513B*8 10G Ethernet code blocks obtained by multiplexing and encoding to a GFP frame containing sixteen 513-byte blocks.

For the GFP structure obtained through the above process, a new UPI must be applied to identify the structure. For example, in the presence of an FCS, assuming that the GFP frame contains sixteen 513-byte blocks, four groups of 16*8 512-bit 10G Ethernet code blocks may be mapped to the GFP frame; a header of the GFP frame may be set to PTI=000, PFI=1, and EXI=0000; UPI may be set to 0000 1111; and since the payload is 513*16=8208 bytes, it is set that PLI=8208+12=8220.

The above description merely provides an instance of the mapping process for uniformly mapping the four groups of 512-bit 10G Ethernet code blocks obtained by multiplexing and encoding to a GFP frame, that is, an instance of the mapping process for gathering Syn fields of all 512-bit code blocks in each group into one byte and then arranging all the 512-bit code blocks after the Syn fields sequentially; however, the present invention is not limited to this arrangement method, and other methods may also be used to uniformly map the 10G Ethernet code blocks to the GFP frame.

The above description is given by taking the multiplexing process for encoding the four groups of 10G Ethernet signals through the (64*N)B/(64*N+1)B (N=8) encoding scheme to uniformly distribute the four groups of 10G Ethernet code blocks as an example; however, the present invention is not limited thereto.

In Step S102, the obtained GFP frame is mapped to an OPU3 of an OTN, and is sent out. When the GFP frame is being sent, if it is found that payload data in the GFP frame is not enough to maintain continuous data transmission, justification control is performed on the GFP frame.

Figure 8:
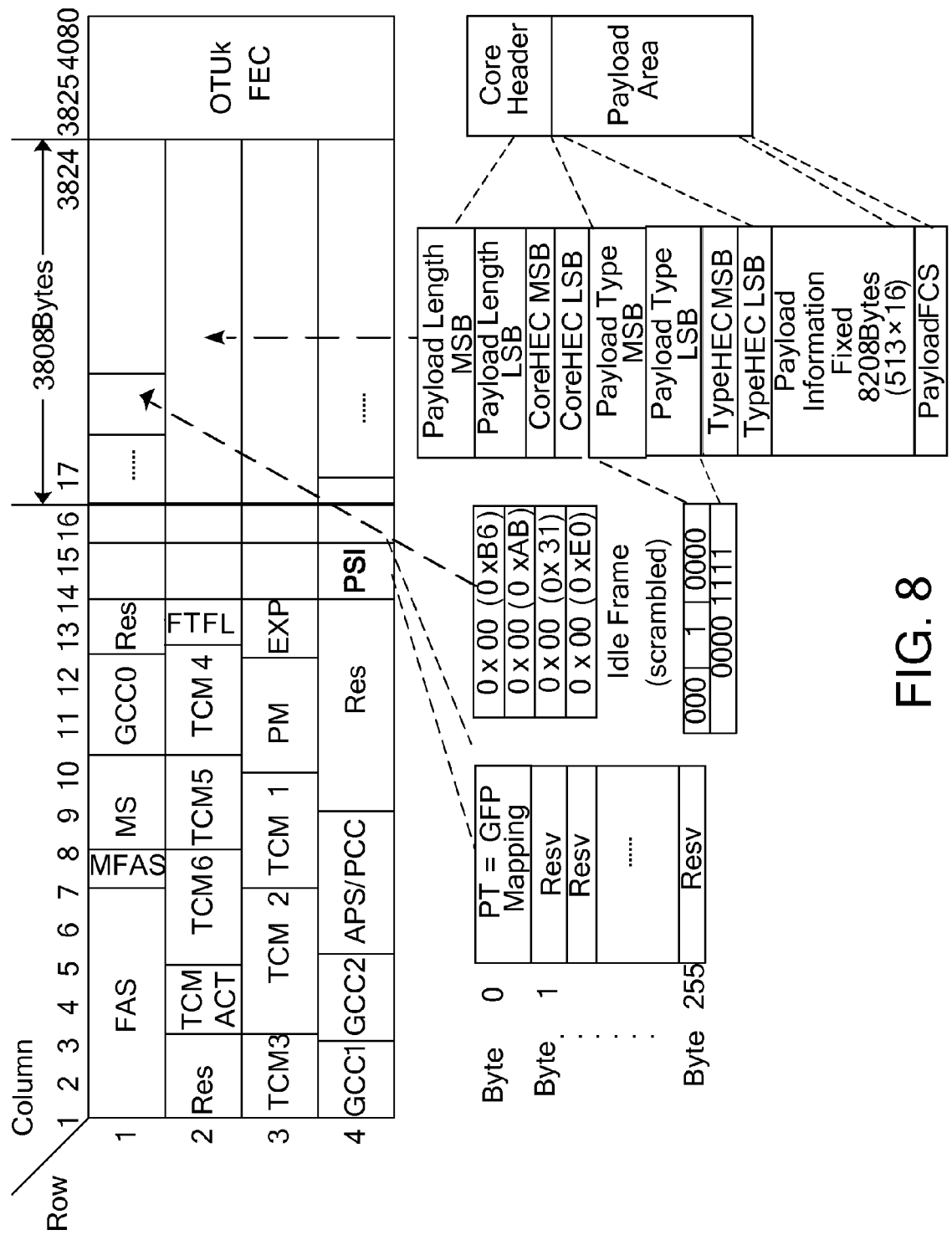
FIG. 8 is a schematic view of a mapping process for mapping the GFP frame to the OPU3 of the OTN according to the first embodiment of the present invention.

The instance of the mapping process for mapping the four groups of 16*8 512-bit 10G Ethernet code blocks to the GFP frame containing sixteen 513-byte blocks in the presence of an FCS is still taken as an example, and FIG. 8 shows a mapping process for mapping the obtained GFP frame to the OPU3 of the OTN. It can be seen that, the obtained GFP frame is mapped to a payload area of an OTN frame corresponding to the OPU3, and a corresponding PT is set in a PSI to identify a GFP mapping manner.

Since the payload rate of the OPU3 is higher than the encoding rate of the four groups of 10G Ethernet code blocks, and the rate may vary with different groups of 10G Ethernet code blocks, an encoding clock of a group of 10G Ethernet code blocks with the highest rate may be used as an encoding reference clock of each group of 10G Ethernet code blocks, or a clock of the OTN may be used as an encoding reference clock of each group of 10G Ethernet code blocks. Therefore, when the GFP frame is being sent, client-layer data (that is, payload data) may be not enough to maintain continuous data transmission. At this time, idle blocks for justification control need to be filled for each group of 10G Ethernet code blocks when the four groups of 10G Ethernet code blocks are mapped to the GFP frame. If a group of 10G Ethernet code blocks has a low encoding rate, more idle blocks are filled for the group of 10G Ethernet code blocks, and corresponding identifiers are used to identify the idle blocks. Definitely, it is also feasible to fill some idle blocks, for example, an idle frame as shown in FIG. 8, into the GFP frame first, and then fill idle blocks into each group of 10G Ethernet code blocks in the GFP frame to compensate for the difference in the encoding rates of different groups of 10G Ethernet code blocks.

Corresponding to the above method, in the first embodiment, the present invention further provides a sending device, which includes a mapping unit and a transmission unit. The sending device may further include a justification unit.

The mapping unit is adapted to uniformly map four groups of 10G Ethernet code blocks to a payload area of a GFP frame according to a preset mapping manner, and set a corresponding identifier to identify the mapping manner. The specific implementation is similar to the related description in the above method embodiment, so the details will not be described herein again. In specific implementation, four groups of 10G Ethernet signals are multiplexed and encoded to obtain four groups of 10G Ethernet code blocks, and then each group of 10G Ethernet code blocks is mapped to the payload area of the GFP frame.

The transmission unit is adapted to map the GFP frame to an OTN, and send the GFP frame.

The justification unit is adapted to perform justification control on the GFP frame by using idle blocks if it is found that data in the payload area of the GFP frame is not enough when the GFP frame is being sent. In specific implementation, idle blocks may be filled into each group of 10G Ethernet code blocks; and it is also feasible to fill some idle blocks into the GFP frame first, and then fill idle blocks into each group of 10G Ethernet code blocks in the GFP frame to compensate for the difference in the encoding rates of different groups of 10G Ethernet code blocks.

Corresponding to the method for mapping Ethernet code blocks to an OTN for transmission according to the first embodiment of the present invention, in the first embodiment, the present invention further provides a receiving and processing process of the method for mapping Ethernet code blocks to an OTN for transmission. The process is as follows.

Decode a received GFP frame to obtain an identifier for identifying a mapping manner, and obtain a mapping manner for uniformly mapping four groups of 10G Ethernet code blocks to a payload area of the GFP frame according to a value of the identifier; and decode the four groups of 10G Ethernet code blocks in the GFP frame according to the mapping manner. The specific steps are as follows.

The received GFP frame is decoded to obtain a core header, and a payload area of the GFP frame is decoded according to the core header to obtain a payload header.

A header UPI of the GFP frame is obtained according to the payload header, and the mapping manner for uniformly mapping the four groups of 10G Ethernet code blocks to the payload area of the GFP frame is obtained according to a value of the UPI.

The four groups of 10G Ethernet code blocks in the GFP frame are decoded according to the mapping manner.

If a corresponding idle block is found in the decoding process, the idle block is deleted.

Corresponding to the above receiving and processing process of the method, in the first embodiment, the present invention further provides a receiving device, which includes an information acquisition unit and a decoding unit.

The information acquisition unit is adapted to decode a received GFP frame to obtain an identifier for identifying a mapping manner, and obtain a mapping manner for uniformly mapping four groups of 10G Ethernet code blocks to a payload area of the GFP frame according to a value of the identifier.

The decoding unit is adapted to decode the four groups of 10G Ethernet code blocks in the GFP frame according to the mapping manner. The decoding unit is further adapted to delete a corresponding idle block for justification control after the idle block is found in the decoding process.

In a second embodiment, the present invention further provides a method for mapping Ethernet code blocks to an OTN for transmission, which uses an interleaving mode to map four groups of 10G Ethernet code blocks to an OTN for transmission. Referring to FIG. 9, the method includes the following steps.

In Step S201, a plurality of 10G Ethernet code blocks is uniformly distributed into four groups according to a mapping manner for arranging a predetermined number of 10G Ethernet code blocks in each row of an OTN frame corresponding to an OPU3, each group of 10G Ethernet code blocks is interleaved into a payload area of each row of the OTN frame, and a PT in a PSI of an OH portion of the OTN frame is used to indicate the mapping manner.

In order to ensure that a plurality of 10G Ethernet code blocks is uniformly distributed into four groups, four groups of 10G Ethernet signals may be multiplexed and encoded, and the multiplexing and encoding process may be performed through the manner shown in FIG. 5.

The code blocks in each row of the OTN frame corresponding to the OPU3 may be arranged in different orders. The number of code blocks to be arranged in each row of the OTN frame corresponding to the OPU3 may be determined by the size of each group of 10G Ethernet code blocks and the number of bytes occupied by each row of the payload area of the OTN frame corresponding to the OPU3.

The maximum value of the number K of 10G Ethernet code blocks that can be arranged in each row of the payload area of the OTN frame is calculated according to 3808 bytes, that is, 3808 Bytes*8 Bit/Bytes=30464 Bit, occupied by each row of the payload area of the OTN frame corresponding to the OPU3, as well as the size of four groups of 10G Ethernet code blocks having an encoding rate smaller than the payload rate corresponding to the OPU3.

Figure 10:
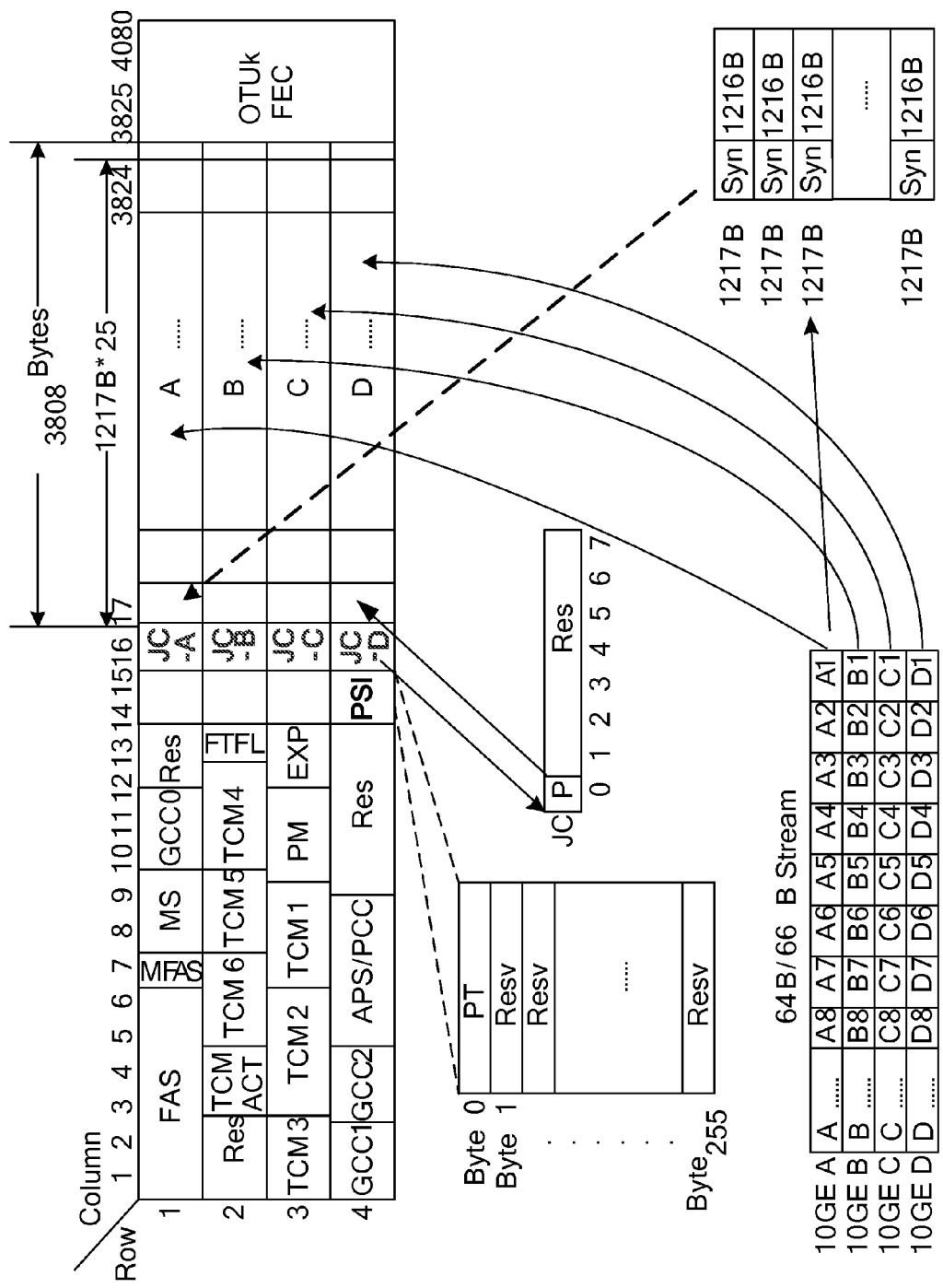
FIG. 10 is a schematic view of an instance of mapping each group of 10G Ethernet standard code blocks to each row of the OTN frame according to the second embodiment of the present invention.

In Example 1, when a (64*N)B/(64*N+1)B (N=19) encoding scheme is used, 1217-Bit code blocks are obtained. Since 1217 Bit*25=30425 Bit≦30464 Bit≦1217 Bit*26=31642 Bit, it can be seen that at most 25 1217-Bit 10G Ethernet code blocks can be arranged in each row of the OTN frame corresponding to the OPU3. Referring to FIG. 10, an instance of a mapping process for mapping a plurality of 1217-Bit 10G Ethernet code blocks in each group to each row of the OTN frame is provided. It can be seen that, a plurality of 1217-Bit 10G Ethernet code blocks in each group is mapped to the payload area of each row of the OTN frame corresponding to the OPU3 (corresponding to the 3808 Bytes portion in the figure), and a PT in a PSI of an OH portion of the OTN frame is used to indicate the mapping manner.

In Example 2, when a (64*N)B/(64*N+1)B (N=25) encoding scheme is used, 1601-Bit code blocks are obtained. Since 1601 Bit*19=30419 Bit≦30464 Bit≦1601 Bit*20=32020 Bit, each row of the OTN frame corresponding to the OPU3 can accommodate at most 19 1601-Bit 10G Ethernet code blocks, that is, 30419 Bit.

In Step S202, the OTN frame is sent. If it is found that data in the payload area of each row of the OTN frame is not enough when the OTN frame is sent, justification control is performed on each row of the OTN frame by using an idle block, and a corresponding justification control identifier is set at an OH portion in each row of the OTN frame to indicate that the idle block in each row is adapted for justification control.

1217-Bit 10G Ethernet code blocks and 1601-Bit 10G Ethernet code blocks are still taken as an example.

It can be seen from the above that, at most 25 1217-Bit 10G Ethernet code blocks can be arranged in each row of the OTN frame corresponding to the OPU3. In this case, the minimum payload capacity of the OPU3 is 30425/30464*40.149716311 GBits/s=40.09831666 GBits/s, greater than the sum of maximum payload rates of the four groups of 10G Ethernet code blocks, that is, 1217/1216*10 GBits/s*4*1.000100=40.03689803 GBits/s, so that the encoding justification control needs to be performed in the process of encoding the OTN frame.

In the case that at most 19 1601-Bit 10G Ethernet code blocks can be arranged in each row of the OTN frame corresponding to the OPU3, the minimum payload capacity of the OPU3 is 30419/30464*40.149716311 GBits/s=40.09040902 GBits/s, greater than the sum of maximum payload rates of the four groups of 10G Ethernet code blocks, that is, 1601/1600*10 GBits/s*4*1.000100=40.0290025 GBits/s. Therefore, in this case, the encoding justification control also needs to be performed in the process of encoding the OTN frame.

When justification control is performed, an idle block containing no data may be inserted into each row of the OTN frame to serve as a justification block, and an identifier JC for performing justification control on each row is set as a client specific portion of each row of the OTN frame. A justification opportunity overhead P in the JC may be set to 0, indicating that data of the payload area of a certain row in the OTN frame is enough, and the encoding justification control is not needed. The justification opportunity overhead P in the JC may be set to 1, indicating that the data of the payload area of a certain row in the OTN frame is not enough, and an idle block containing no data is set in the row.

The first block of each row may be used as a justification block, and a justification indicator JC may be set to identify the justification block. Other blocks of each row may also be used as justification blocks. In a word, the justification opportunity space may vary, and the position of the JC may also vary.

The instance of the mapping process for mapping a plurality of 1217-Bit 10G Ethernet standard code blocks in each group to each row of the OTN frame shown in FIG. 10 is still taken as an example. It can be seen that, identifiers JC-A, JC-B, JC-C, and JC-D for performing justification control on each row are set at four bytes in the $16^{th}$ column of the OTN frame, and when the P of the JC in each row is set to 1, the first code block of each row is an idle block filled thereto.

The above description is given by taking the mapping process for mapping a plurality of 1217-Bit 10G Ethernet code blocks to the OTN frame as an example; however, the present invention is not thus limited, but may also be implemented to map a plurality of 10G Ethernet code blocks of any size in a certain group to each row of the OTN frame corresponding to the OPU3.

Corresponding to the method according to the second embodiment of the present invention, in the second embodiment, the present invention further provides a sending device, which includes a mapping unit and a transmission unit. The sending device may further include a justification unit.

The mapping unit is adapted to uniformly distribute a plurality of 10G Ethernet code blocks into four groups according to a mapping manner for arranging a predetermined number of 10G Ethernet code blocks in each row of an OTN frame corresponding to an OPU3, interleave each group of 10G Ethernet code blocks into a payload area of each row of the OTN frame, and use a PT in a PSI of an OH portion of the OTN frame to indicate the mapping manner.

The transmission unit is adapted to map the obtained OTN frame to the OPU3 of the OTN, and send the OTN frame.

The justification unit is adapted to perform justification control on each row of the OTN frame by using an idle block if it is found that data in the payload area of each row of the OTN frame is not enough when the OTN frame is sent, and set a corresponding justification control identifier at an OH portion in each row of the OTN frame to indicate that the idle block in each row is adapted for justification control.

Corresponding to the method according to the second embodiment of the present invention, in the second embodiment, the present invention further provides a receiving and processing process of the method for mapping Ethernet code blocks to an OTN for transmission. The process is as follows.

Decode a received OTN frame to obtain a mapping manner indication identifier, and obtain a mapping manner for arranging a predetermined number of 10G Ethernet code blocks in each row of the OTN frame corresponding to an OPU3 according to the mapping manner indication identifier; decode the 10G Ethernet code blocks in the OTN frame according to the mapping manner; and obtain a justification control identifier of each row in the OTN frame in the decoding process, determine whether an idle block is inserted into each row of the OTN frame according to the justification control identifier, and delete the idle block after determining that the idle block is inserted. The specific steps are as follows.

The received OTN frame is decoded to obtain a PT in a PSI of an OH portion of the OTN frame.

The mapping manner for arranging the predetermined number of 10G Ethernet code blocks in each row of the OTN frame corresponding to the OPU3 is obtained according to the PT, and the 10G Ethernet code blocks in each row of the OTN frame are decoded according to the mapping manner.

An indicator P for indicating justification in each row of the OTN frame is obtained in the decoding process, it is determined whether an idle block is inserted into each row of the OTN frame according to the indicator P, and the idle block is deleted if the idle block is inserted.

Corresponding to the receiving and processing process according to the second embodiment of the present invention, in the second embodiment, the present invention further provides a receiving and processing device, which includes an information acquisition unit and a decoding unit.

The information acquisition unit is adapted to decode a received OTN frame to obtain a mapping manner indication identifier PT, and obtain a mapping manner for arranging a predetermined number of 10G Ethernet code blocks in each row of the OTN frame corresponding to an OPU3 according to the mapping manner indication identifier PT.

The decoding unit is adapted to decode the 10G Ethernet code blocks in each row of the OTN frame according to the mapping manner. The decoding unit is further adapted to determine whether an idle block is inserted into each row of the OTN frame according to a justification control identifier in each row of the OTN frame, and delete the idle block after determining that the idle block is inserted.

It can be seen from the technical solutions of the present invention that, according to the preset mapping manner, the four groups of 10G Ethernet code blocks are mapped to the payload area of the GFP frame, or the four groups of 10G Ethernet code blocks are interleaved into the payload area of the OTN frame. Thus, the present invention provides specific solutions for mapping four groups of 10G Ethernet code blocks having an encoding rate smaller than the minimum payload bandwidth of the OPU3 to the OTN for transmission, thereby achieving transparent transmission without changing the mature OTN architecture.

It will be apparent to persons skilled in the art that various modifications and variations can be made to the present invention without departing from the scope or spirit of the invention. In view of the foregoing, it is intended that the present invention cover modifications and variations of this invention provided they fall within the scope of the following claims and their equivalents.

What is claimed is:

1. A method for mapping Ethernet code blocks to an optical transport network (OTN) for transmission, comprising:

uniformly mapping four groups of 10 Gigabit (10G) Ethernet code blocks to a payload area of a general frame provision (GFP) frame according to a preset mapping manner, and setting a first corresponding identifier to identify the preset mapping manner; and wherein the uniformly mapping the four groups of 10G Ethernet code blocks to the payload area of the GFP frame comprises: multiplexing and encoding four groups of 10G Ethernet signals using a (64*N)B/(64*N+1)B encoding scheme to obtain the four groups of 10G Ethernet code blocks, and mapping each group of the obtained 10G Ethernet code blocks to the payload area of each row of the GFP frame, wherein each group of 10G Ethernet code blocks has an encoding rate smaller than a minimum payload bandwidth of an Optical Channel Payload Unit-3 (OPU3), and the minimum payload bandwidth of the OPU3 is 40.149716311 GBits/s;

wherein the setting the first corresponding identifier to identify the preset mapping manner comprises: setting a core header of the GFP frame to identify the payload area and setting a payload type of the payload area, and setting a header user payload identifier (UPI) in the payload type, to identify the mapping manner; and mapping the GFP frame to the OTN, and sending out the GFP frame.

2. The method according to claim 1, further comprising:

performing justification control on the GFP frame by using an idle block if it is found that data in the payload area of the GFP frame is not enough when the GFP frame is being sent, wherein the performing the justification control on the GFP frame by using the idle blocks comprises at least one step of the group consisting of:

inserting idle blocks containing no data into the GFP frame, inserting an idle block containing no data into each group of the 10G Ethernet code blocks in the GFP frame, and using corresponding identifiers to indicate that the idle blocks are adapted for justification control; and inserting an idle block containing no data into each group of the 10G Ethernet code blocks in the GFP frame, and using a second corresponding identifier to indicate that the idle block is adapted for justification control.

3. The method according to claim 1, further comprising:

decoding the received general frame provision (GFP) frame to obtain the identifier for identifying the mapping manner, and obtaining the mapping manner for uniformly mapping the four groups of 10 Gigabit (10G) Ethernet code blocks to the payload area of the GFP frame according to a value of the identifier; and decoding the four groups of 10G Ethernet code blocks in the GFP frame according to the mapping manner.

4. The method according to claim 3, further comprising:

deleting a corresponding idle block for justification control after the corresponding idle block is found in the decoding process.

5. A sending device, comprising:

a mapping unit, configured to uniformly map four groups of 10 Gigabit (10G) Ethernet code blocks to a payload area of a general frame provision (GFP) frame according to a preset mapping manner, and set a corresponding identifier to identify the preset mapping manner, wherein the uniformly mapping the four groups of 10G Ethernet code blocks to the payload area of the GFP frame comprises: multiplexing and encoding four groups of 10G Ethernet signals using a (64*N)B/(64*N+1)B encoding scheme to obtain the four groups of 10G Ethernet code blocks, and mapping each group of the obtained 10G Ethernet code blocks to the payload area of each row of the GFP frame, wherein each group of 10G Ethernet code blocks has an encoding rate smaller than a minimum payload bandwidth of an Optical Channel Payload Unit-3 (OPU3), and the minimum payload bandwidth of the OPU3 is 40.149716311 GBits/s; wherein the setting a corresponding identifier to identify the preset mapping manner comprises: setting a core header of the GFP frame to identify the payload area and set a payload type of the payload area, and setting a header user payload identifier (UPI) in the payload type, to identify the mapping manner; and a transmission unit, configured to map the GFP frame to an optical transport network (OTN), and send the GFP frame.

6. The device according to claim 5, further comprising:

a justification unit, configured to perform justification control on the GFP frame by using idle blocks if it is found that data in the payload area of the GFP frame is not enough when the GFP frame is being sent.

7. A receiving device, comprising:

an information acquisition unit, configured to decode a received general frame provision (GFP) frame to obtain an identifier for identifying a mapping manner, and obtain the mapping manner for uniformly mapping four groups of 10 Gigabit (10G) Ethernet code blocks to a payload area of the GFP frame according to a value of the identifier, wherein the uniformly mapping the four groups of the 10G Ethernet code blocks to the payload area of the GFP frame comprises: multiplexing and encoding four groups of 10G Ethernet signals using a (64*N)B/(64*N+1)B encoding scheme to obtain the four groups of 10G Ethernet code blocks, and mapping each group of the obtained 10G Ethernet code blocks to the payload area of each row of the GFP frame, wherein each of the group of 10G Ethernet code blocks has an encoding rate smaller than a minimum payload bandwidth of an Optical Channel Payload Unit-3 (OPU3), and the minimum payload bandwidth of the OPU3 is 40.149716311 GBits/s; and a decoding unit, configured to decode the four groups of 10G Ethernet code blocks in the GFP frame according to the mapping manner.

8. The device according to claim 7, wherein the decoding unit is further configured to delete a corresponding idle block for justification control after the corresponding idle block is found in the decoding process.

* * * * *